Patented Dec. 25, 1934

1,985,496

UNITED STATES PATENT OFFICE 1,985,496

PROCESS OF MAKING MARGARINE

Benjamin R. Harris, Chicago, Ill.

No Drawing. Application January 8, 1934,
Serial No. 705,826

11 Claims. (Cl. 99—13)

My invention relates to the manufacture of margarine and is a continuation in part of my copending application Serial No. 697,534, filed November 8, 1933. My present invention is also a continuation in part of my prior application, Serial #685,081, filed August 14, 1933.

My prior application, of which the present is a division, describes the formation of new chemical substances adapted for use in emulsions generally and whenever interface modifying properties are desired. The material there described is particularly advantageous, however, in the production of margarine. As described, in some detail in my prior Patent No. 1,917,254, conventional margarine suffers from so-called weeping or leaking of the moisture therefrom. In my prior patent, I disclose a method of preventing this leaking or weeping action by the use of materials of a class I term "hydrophyllic lipins". The chemical composition described in application Serial No. 697,534 referred to above may be termed a hydrophyllic lipin and possesses the characteristics of the materials described in the prior patent.

The principal object of the present invention is the use in margarine of materials of the class described in my copending application.

Another object is the provision of an improved method of producing a non-weeping margarine.

Other objects and features of the invention will be apparent as the description progresses.

Those skilled in the art are referred to my copending application for a complete description of the manner of making the materials of my invention. In general, the method comprises treatment of an ordinary triglyceride, such as the oils and fats of commerce, to produce therein a proportion of various fatty acid diglycerides and usually lesser proportions of mixtures of various fatty acid mono-glycerides having free hydroxy groups. The composition as a whole has definite hydrophillic properties and is capable of dispersing in aqueous media, producing pastes of varying moisture concentration which lend themselves to dispersion in plastic margarine. This hydrophillic material, when employed in margarine, will prevent weeping thereof and assist in maintaining a more stable emulsion. These materials are preferably produced in the form of an aqueous paste and in this form, either with or without the use of additional moisture, are blended into the completed plastic margarine emulsion.

There are essentially three steps in the production of the margarine according to my invention, namely, the formation of the plastic margarine emulsion; the formation of the hydrophillic material, preferably as dispersed in aqueous media, in paste, or other form; and the blending of this paste with or without additional moisture into the plastic margarine mass. In order that the present disclosure may be complete, I shall first describe the method of making my improved hydrophillic materials.

The general process comprises partially saponifying a triglyceride with an alkaline saponifying agent, the quantity of alkali employed being insufficient to completely saponify the triglyceride. The resulting mixture contains a plurality of fatty acid esters with free hydroxy groups with some soap. The soap in the mixture is then decomposed either in whole or in part with an acid. When the material is employed in margarine, an innocuous acid should be selected such as hydrochloric acid, phosphoric acid, tartaric acid, lactic acid, citric acid, and the like. The alkaline saponifying agent is preferably introduced melted but may be introduced in other forms into the triglyceride, and the reaction allowed to proceed at a suitable temperature. In my preferred manner of carrying out the process, the partially saponified mixture is emulsified with approximately its own weight of water to form a paste. This paste is then treated with the acid to decompose the soap therein either in whole or in part. The following examples are illustrative of the manner of preparing the hydrophyllic material.

*Example No. 1*

500 parts of hydrogenated cottonseed oil (melting point 140° F.) are melted and kept at a temperature of 220° C. To this is added, with stirring, a eutectic mixture of 12½ parts of caustic soda and 17½ parts of caustic potash, also melted and kept at 220° C. Vigorous stirring is continued for ten minutes.

This molten mixture is then cooled to about 170° C. and poured gradually, with stirring, into 500 parts of water at 70° C. The paste is then cooled down to about 40° C., when 47.5 parts of "concentrated" hydrochloric acid, diluted with 90 parts of water, are stirred in. The resultant product is a paste which lends itself readily to incorporation with oleomargarine in a margarine blender.

*Example No. 2*

500 parts of partially hydrogenated cottonseed oil (melting point about 110° F.) are melted and kept at a temperature of 220° to 235° C. To this is added, with stirring, a eutectic mixture of 12½ parts of caustic soda and 17½ parts of caustic potash, also melted and kept at 220° to 235° C. Vigorous stirring is continued for ten minutes.

This molten mixture is then cooled to about 170° C. and poured gradually, with stirring, into 500 parts of water at 70° C. The paste is then cooled down to about 40° C., when 62.5 parts of "concentrated" hydrochloric acid, diluted with 90 parts of water, are stirred in. The resultant product is a paste which lends itself readily to incorporation with oleomargarine in a margarine blender.

The present example differs from Example 1 in that the paste is substantially completely neutralized. With the percentages of materials given, the resulting product is approximately neutral to litmus.

*Example No. 3*

400 parts of oleostearine are melted, heated and kept at 200° C. To this melt are added, with vigorous stirring, 20 parts of caustic soda dissolved in 30 parts of water. The caustic soda solution is added very slowly at first so as to keep the foaming down to a minimum. As the foam gradually subsides, more caustic soda solution is added. During the addition of the caustic solution, the temperature of the oleostearine drops to about 180° C. and is maintained at this temperature by supplying sufficient heat to the melt.

After all the caustic soda is in, the stirring is continued for an additional five to ten minutes. This melt is then run, with agitation, into 400 parts of water at 75° C. This mixture is then heated and simultaneously stirred until a smooth, dispersed product is obtained. This is cooled down to 30° C. and 130 parts of 28% lactic acid are stirred in.

The product is a homogeneous paste with marked water-imbibing properties and readily blendable with margarine.

*Example No. 4*

300 parts of cottonseed stearine (iodine number not over 90) are melted to 175° C. and treated with 15 parts of caustic soda dissolved in 65 parts of glycerol, and heated to the same temperature. The glycerol-soda solution is added gradually with stirring and heat control so that a temperature of approximately 175° is maintained throughout. There is some foaming, but not very much.

After all the glycerol-soda is in, the heating and stirring are continued for an additional five minutes. This mixture is then run into 300 parts of water kept at 70° C. and stirring is continued until a smoothly dispersed paste is obtained and the temperature has dropped to about 45° C. Finally, into this paste are mixed 62 parts of aqueous hydrochloric acid, 20% solution.

*Example No. 5*

400 parts of oleostearine are melted, heated and kept at 200° C. To this melt are added, with vigorous stirring, 20 parts of caustic soda dissolved in 30 parts of water. The caustic soda solution is added very slowly at first so as to keep the foaming down to a minimum. As the foam gradually subsides, more caustic soda solution is added. During the addition of the caustic solution, the temperature of the oleostearine drops to about 180° C. and is maintained at this temperature by supplying sufficient heat to the melt.

After all the caustic soda is in, the stirring is continued for an additional five to ten minutes. This melt is then run, with agitation, into 400 parts of water at 75° C. This mixture is then heated and simultaneously stirred until a smooth dispersed product is obtained. This is cooled down to 30° C. and 161 parts of 28% lactic acid are stirred in.

The paste so produced may be diluted to contain 75 to 80% of moisture, and, although it contains a large proportion of diglycerides, it is easily blended into plastic margarine.

More than the above stated proportions of alkali may be used, in which case less unchanged triglyceride will appear in the final product under the above prescribed conditions. If desired, however, smaller proportions of alkali than those indicated may be used, in which case the product will contain a lesser proportion of modified triglyceride than in the above examples, and a greater proportion of unchanged triglyceride. The proportion of acid also may be varied a great deal, depending upon the characteristics desired in the final product. Obviously the hydrogen ion concentration and/or the amount of soap present will be determined by the amount of acid used. The larger the amount of acid used, the greater will be the proportion of free fatty acids, and less soap in the finished product.

If sufficient acid is used to neutralize the reaction mixture as, for instance, in Example No. 5, the resulting reaction product will form a smooth paste which can be incorporated in plastic margarine and affect the interfaces of the emulsion sufficiently to make the margarine nonleaking and keep the desired amount of moisture therein. However, a slight amount of soap may remain if desired, such as, for example, about 1% or less, or, as in some of the examples, if about 75 to 90% of the soap is neutralized, based on the amount of alkali employed.

In the preferred manner of use, the paste is made prior to neutralization thereof, in which case, even though it is made substantially neutral, as described in Example 5, it will remain smooth, can be thinned out with additional amounts of aqueous material, and is readily blended into the margarine where it will perform its role in stabilizing the emulsion and drying up interstitial moisture.

In incorporating the paste into the margarine, the latter is made according to any suitable formula and processed to the plastic emulsion stage where it is ready for treatment on a blender. Assume the paste is of the 50% character, that is with equal amounts of water and hydrophilic material. In order to incorporate this paste better into the margarine, about an equal amount of moisture is added, leaving the paste with about 20 to 25% of solid material. This paste may be still further diluted, if desired.

In the blending operation, 100 lbs. of the plastic margarine are placed in a blender, preferably with Z type agitators and 2% of the 25% paste added. This represents about ½% of the hydrophyllic material made in accordance with the examples given. Additional milk may also be placed in the blender together with salt and sodium benzoate, and the blender operated until all moisture is taken up and the product is homogeneous. In the example given, a dry homogeneous margarine is easily produced with a moisture content ranging from 16% to 17%. Although the hydrophyllic material of my invention may contain a large amount of diglycerides, it is readily incorporated into the plastic margarine, even though ordinarily a diglyceride is incorporated into margarine usually with some difficulty. This ease of incorporation seems to be due to the fact that the diglycerides of my hydrophillic material are interspersed with other media which facilitate and enhance its dispersibility in the plastic margarine.

In the margarine blending operation described hereinabove, the amount of my hydrophyllic material employed is ½%, based upon dry weights. This is not to be taken as a limitation of the amount to be used, since as little as ¼% of the hydrophyllic material produces a marked effect in a margarine with approximately 16 to 17% of moisture. Approximately twice this amount produces a more marked effect, and even somewhat greater amounts may be employed should it be desired to incorporate a still larger amount of moisture in the margarine. However, the amount should not be high enough to change the physical characteristics of the margarine, such as texture, grain and palatability. It is to be noted that the amount of moisture retained in the margarine by the material of my invention is not explained by the absorption thereof by the hydrophyllic lipin itself, as the amount used is very small. It is due rather to the interface modifying characteristics of the hydrophyllic lipin whereby the water is bound at the interfaces even though it may not have been completely emulsified in the original emulsion.

What I claim as new and desire to protect by Letters Patent of the United States is:

1. The method of making an improved margarrine, which comprises forming a plastic margarine emulsion of oleaginous and aqueous materials, partially saponifying an oleaginous material of a class consisting of oils and fats, forming an aqueous paste of the resulting product, neutralizing said paste, and blending the paste into the plastic margarine emulsion.

2. The method of making an improved margarine, which comprises forming a plastic margarine emulsion of oleaginous and aqueous materials, partially saponifying an oleaginous material of a class consisting of oils and fats, forming an aqueous paste of the resulting product, neutralizing said paste, and blending the paste with an additional amount of aqueous material into the plastic margarine emulsion.

3. The method of making an improved margarine, which comprises forming a plastic margarine emulsion of oleaginous and aqueous materials, partially saponifying an oleaginous material of a class consisting of oils and fats, forming an aqueous paste of the resulting product, neutralizing said paste, and blending the paste into the plastic margarine emulsion together with an accessory substance of a class consisting of salt and benzoate.

4. The method of making an improved margarine which comprises forming a plastic margarine emulsion; adding to a material of a class consisting of oils and fats, a proportion of an alkali sufficient to partially saponify such material, heating the mixture to reaction, forming an aqueous paste of the resulting material, and blending said paste into the plastic margarine emulsion.

5. The method of making an improved margarine which comprises forming a plastic margarine emulsion, adding to a material of a class consisting of oils and fats, a proportion of an alkali sufficient to partially saponify such material, heating the mixture to reaction, forming an aqueous paste of the resulting material, neutralizing said paste, and blending said paste into the plastic margarine emulsion.

6. The method of making an improved margarine which comprises forming a plastic margarine emulsion, adding to a material of a class consisting of oils and fats, a proportion of an alkali sufficient to partially saponify such material, heating the mixture to reaction, forming an aqueous paste of the resulting material, neutralizing said paste, adding an additional amount of aqueous liquid thereto to thin the same, and blending the thinned paste into the plastic margarine emulsion.

7. The method of making an improved margarine which comprises forming a plastic margarine emulsion, partially saponifying a hydrogenated liquid oil, forming an aqueous paste of the partially saponified oil, neutralizing the same, and blending the neutralized paste into the plastic margarine emulsion.

8. The method of making an improved margarine which comprises forming a plastic margarine emulsion, partially saponifying a hydrogenated cottonseed oil, forming an aqueous paste of the partially saponified oil, neutralizing the same, and blending the neutralized paste into the plastic margarine emulsion.

9. The method of making an improved margarine, which comprises forming a plastic margarine emulsion, partially saponifying a hydrogenated oleostearine, forming an aqueous paste of the partially saponified oil, neutralizing the same, and blending the neutralized paste into the plastic margarine emulsion.

10. The method of making an improved margarine which includes the step of blending into said margarine while in a plastic form a hydrophyllic material in paste form formed by partially saponifying an oleaginous material of a class consisting of oils and fats, and neutralizing the partially saponified product to form a mixture including a proportion of fatty acid, mono- and di-glycerides.

11. An improved substantially dry margarine comprising a plastic emulsion of oleaginous and aqueous materials, and a relatively small amount of the product of the partial saponification of a triglyceride oil or fat and the neutralization thereof, said product containing a mixture of mono and diglycerides and a substantial amount of free fatty acids.

BENJAMIN R. HARRIS.